United States Patent [19]
Stone et al.

[11] Patent Number: 5,440,916
[45] Date of Patent: Aug. 15, 1995

[54] EMERGENCY RESPONSE MOBILE ROBOT FOR OPERATIONS IN COMBUSTIBLE ATMOSPHERES

[75] Inventors: Henry W. Stone, Altadena; Timothy R. Ohm, La Crescenta, both of Calif.

[73] Assignee: The United States of America as represented by the Administrator of the National Aeronautics and Space Administration, Washington, D.C.

[21] Appl. No.: 153,934

[22] Filed: Nov. 15, 1993

[51] Int. Cl.⁶ .................... B25J 19/00; H04N 7/10
[52] U.S. Cl. .................... 73/23.31; 73/31.01; 73/863; 901/15; 901/49
[58] Field of Search .............. 73/23.31, 31.01, 31.02, 73/31.03, 863; 901/15, 49

[56] References Cited

U.S. PATENT DOCUMENTS 4,709,265 11/1987 Silverman et al. .............. 73/863 X
4,984,745 1/1991 Akeel et al. .................... 901/49 X

FOREIGN PATENT DOCUMENTS 277536 12/1987 Japan ........................... 73/23.31

Primary Examiner—Hezron E. Williams
Assistant Examiner—J. David Wiggins
Attorney, Agent, or Firm—John H. Kusmiss; Thomas H. Jones; Guy M. Miller

[57] ABSTRACT

A mobile, self-powered, self-contained, and remote-controlled robot capable of safely operating in a surrounding combustible atmosphere and providing information about the atmosphere to the operator. The robot includes non-sparking and non-arcing electro-mechanical and electronic components designed to preclude igniting the combustible atmosphere, and positively pressurized enclosures that house the electro-mechanical and electronic components of the robot and prevent intrusion of the combustible atmosphere into the enclosures. The enclosures are interconnected such that a pressurized gas injected into any one of the enclosures is routed to all the other enclosures through the interconnections. It is preferred that one or more sealed internal channels through structures intervening between the enclosures be employed. Pressure transducers for detecting if the pressure within the enclosures falls below a pre-determined level are included. The robot also has a sensing device for determining the types of combustible substances in the surrounding atmosphere, as well as the concentrations of each type of substance relative to a pre-determined lower explosive limit (LEL). In addition, the sensing device can determine the percent level of oxygen present in the surrounding atmosphere.

14 Claims, 3 Drawing Sheets

EMERGENCY RESPONSE MOBILE ROBOT FOR OPERATIONS IN COMBUSTIBLE ATMOSPHERES

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

1. Technical Field

The invention relates to mobile robots for responding to hazardous materials emergencies where humans cannot go, and particularly to a light weight and economical robot of this type which is capable of operating in an area containing combustible gases.

2. Background Art

The response to emergencies involving hazardous materials spills by human entry teams frequently exposes entry team personnel to toxic chemicals and explosive reactions. Despite the use of protective clothing, serious hazards exist during first entry situations in which the actual nature of the hazard and the chemicals involved may not be known.

Use of a self-powered, self-contained, remote-controlled robot in first entry situation would avoid these risks. However, in some instances the hazardous materials emergency can involve the release of combustible gases and/or vapors into the atmosphere. Such a situation would require a specialized robot whose operation in the combustible environment would not inadvertently ignite the gases or vapors. In addition, such a robot would have to be capable of relaying information to a remote operator about the nature and concentrations of the combustible gases. The design of a robot capable of operating in a combustible atmosphere and providing the aforementioned information presents many problems.

One problem concerns the motors used to move the various parts of the robot. For example those used in its wheels or treads, and those used in its manipulator arm. The motors must not create sparks which could ignite the combustible gases. There are explosion proof motors commercially available. However, such motors are typically large and heavy. The use of such motors would severely limit the usefulness of the robot. The robot must be small and light so that it can be moved with a minimal amount of energy and be able to maneuver in tight places. The robot will have to fit through doorways and around furniture and other obstacles that may be in the way. Accordingly, the use of bulky explosion-proof motors is precluded.

Another problem concerns the electronics typically found in remote-controlled robots. For instance, mechanical relay switching devices used in some circuits could create a spark and ignite the combustible gases in the atmosphere. Some stationary robots operate on a hydraulic-based system, rather than electrical motors and circuits. However, the equipment necessary to implement such a hydraulic-based system is typically too large and heavy. The same physical limitations that existed with the use of explosion-proof motors, would apply to a hydraulic robot, as well.

In addition, electronic devices for operating the robot are typically mounted on the exterior of the robot's frame, thereby being directly exposed to the atmosphere. This raises the issue of damage or equipment failure. The robot will be operated remotely in area where many obstacles may exist. Typically, the operator will be guiding the motion of the robot using cameras mounted on the robot. The atmosphere at the accident sight could be filled with smoke and gases which obscure visibility. In addition, the camera may be located such that certain portions of the accident sight can not be seen. Therefore, a real possibility exists that the robot could crash into obstacles, or objects could fall onto the robot. If the robot's electronic components were damaged, or should fail for some other reason, sparks could be generated which would ignite the combustible gases in the atmosphere.

Another problem exists concerning sensing devices used to detect and analyze combustible gases that may be present at the accident sight. Typically, the sensors available for such a task are separate units resembling a flashlight. They are intended to be carried by emergency response personnel to the accident site. However, it would not be desirable to hold such a sensing device at the end of the robot arm, since it might be broken by accidental impact due to the operator's difficulty in maneuvering the robot as described above.

SUMMARY OF THE INVENTION

The foregoing problems are overcome in a hazardous materials emergency response robot embodying the present invention. The robot is mobile, self-powered, self-contained, and remote-controlled. It includes a drive train section to propel the robot, a manipulator arm to perform various tasks once on site, and both a wrist-mounted camera and separate panable/tiltable camera assembly to provide a visual feedback to a remotely located operator. The robot is also capable of safely operating in a surrounding combustible atmosphere and providing information about the atmosphere to the operator.

To meet the objective of operating safely in a combustible atmosphere, the robot includes three key design features. The first of these features is that the robot includes non-sparking and non-arcing electro-mechanical and electronic components, designed to preclude igniting the combustible atmosphere. The non-sparking and non-arcing electro-mechanical components are preferably brushless DC motors. During normal operation (i.e. when they have not undergone a mechanical or electrical failure) these motors will not produce sparks which could ignite a combustible vapor or gas, as would a conventional brushed motor typically found in electro-mechanically driven robots. The electronic components of the robot are solid state devices devoid of mechanical relay switches that could spark or arc during their operation.

The second design feature, which complements the first, is that the robot's chassis, manipulator, pan/tilt camera assembly, and drive train motor housings are enclosed to allow internal pressurization. These positively pressurized enclosures house the electro-mechanical and electronic components of the robot and prevent intrusion of the combustible atmosphere into the enclosures. Thus, the combustible gases and/or vapors are precluded from coming into contact with the robot's electromechanical and electronic components. This feature provides an additional level of safety to that of the brushless motors and also safeguards against any arcing which might occur if one of the robot's motors or electronic components were to fail.

In the preferred version of the invention, the positive internal pressure is achieved via the use of an onboard tank of compressed air (2200 psi) and a mechanical regulator to reduce the pressure to approximately 2 inches of water. The pressurized enclosures of the robot are for the most part separated from each other by intervening structures not containing any electromechanical or electronic components. These intervening structures are not pressurized. Preferably, the separated enclosures are interconnected such that a pressurized gas injected into any one of the enclosures is routed to all the other enclosures through the interconnections. It might be possible to bridge the intervening structures using external hoses or tubes, although this method exposes the interconnections to damage or kinking. Accordingly, it is preferred that one or more sealed internal channels through the intervening non-pressurized structures be employed. The sealed internal channels are of sufficient cross-sectional size and number so as to ensure a flow rate of gas at least equal to a combined leak rate of the enclosures at a pre-determined pressure. This ensures the pre-determined pressure is maintained even though gas is leaking from the pressurized portions of the robot. Preferably, this pre-determined pressure is chosen to be as low as possible. The pressure need only be high enough to ensure a positive pressure in all the enclosures. Making the pressure low as possible minimizes the leak rate of the system. Therefore, less pressurized gas is needed. Making the pressure as low as possible also has another benefit. The cross-sectional size and number of the sealed internal channels can be minimized. The size and number need only be just sufficient enough to maintain a flow rate at least equal to the minimized leak rate. Minimizing the size and number of the channels has advantages if a pressurized section of the robot should be punctured because the smaller cross-sectional size would aid in limiting the amount of pressurized air that can escape from the sections preceding the punctured section.

The third design feature which provides yet another level of safety is a series of pressure transducers located within the chassis, manipulator arm, pan/tilt camera assembly, and drive train. These pressure transducers are used for detecting if the pressure within the enclosures falls below a pre-determined level. Should the pressure fall below that level, the robot will immediately notify the operator of the problem and automatically shut down to preclude any possibility of igniting the surrounding combustible atmosphere. The robot has also been designed so that in the event of a loss of power or shutdown, it will not roll backwards or forwards, and the arm will lock into place.

To meet the objective of providing information about the atmosphere to the operator, the robot has a sensing device for determining the types of combustible substances in the surrounding atmosphere, as well as the concentrations of each type relative to a pre-determined lower explosive limit (LEL). In addition, the sensing device can determine the percent level of oxygen present in the surrounding atmosphere.

The sensing device includes a nose hole in an end surface of an end effector or gripper assembly located at the distal end of the manipulator arm. An interior channel within this end effector is coupled to the nose hole, and a combustible gas/vapor sensor on board the robot is coupled to the interior channel. In operation, an air pump coupled to the interior channel draws air through said nose hole and routes it to the sensor. The sensor generates the above describe information that is transmitted to the operator.

BRIEF DESCRIPTION OF THE DRAWINGS

FIG. 1b is a rear view of the robot of FIG. 1a.

FIG. 1c is a front view of the robot of FIG. 1a.

FIG. 2a is a side view of the torso and attached pan/tilt camera boom of the robot of FIG. 1a.

FIG. 2b is a cross-sectional view of the interface between the torso and the pan/tilt camera boom of FIG. 2a.

FIG. 3b is a cross-sectional view of the sensor section of the combustible gas sensor assembly of FIG. 3a.

DETAILED DESCRIPTION OF THE INVENTION

Figure 1A:
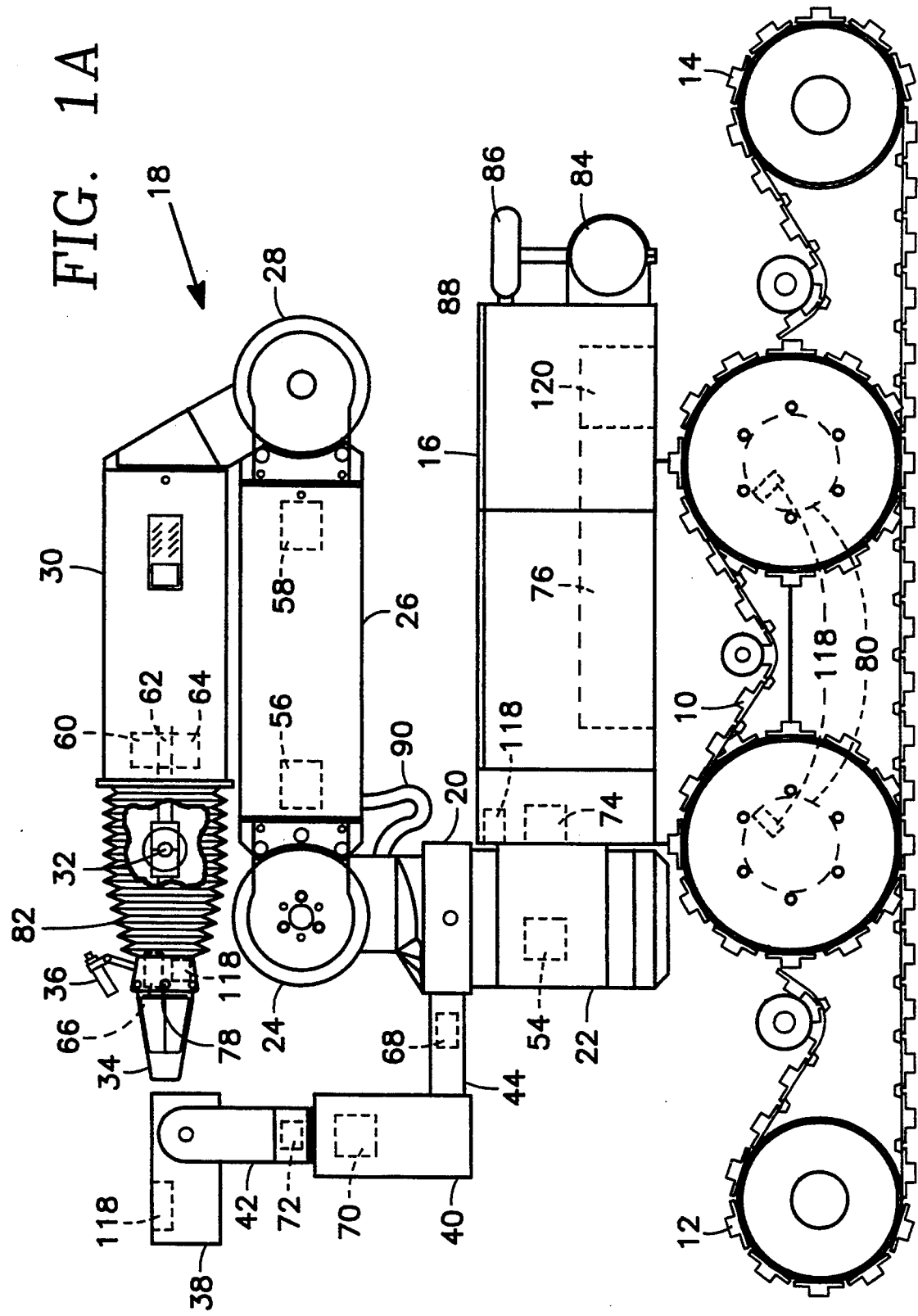
FIG. 1a is a side view of a robot embodying the invention.
Figure 1C:
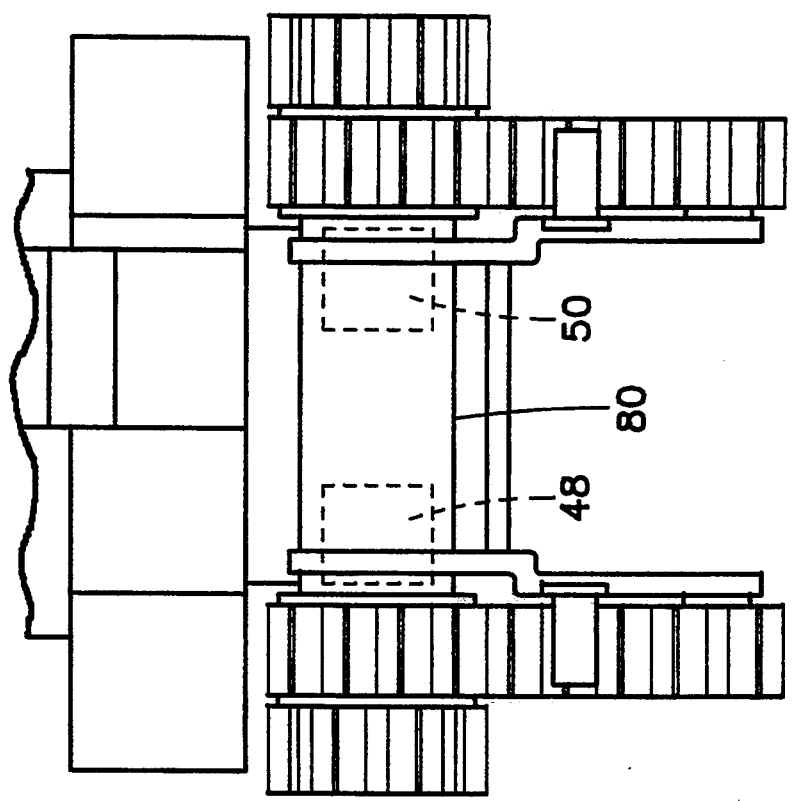
Figure 1B:
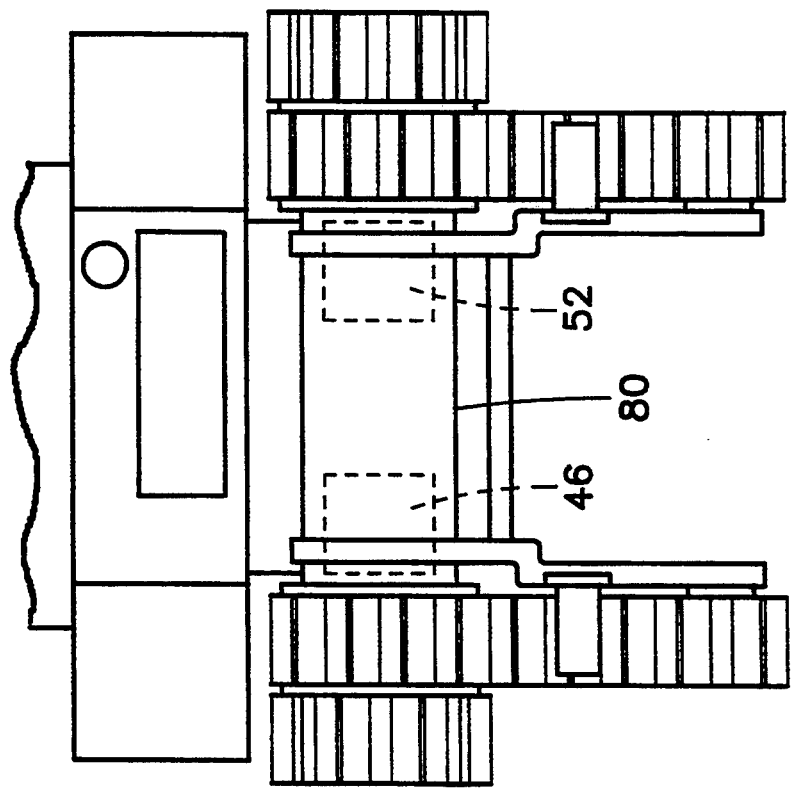

Referring to FIGS. 1a–c, a robot embodying the invention includes a main track drive 10, a front articulated track drive 12 and a rear articulated track drive 14. An example of a commercially available unit which could be used for the just-described drive train is the Andros Mark VA battery-powered mobile robot manufactured by Remotec Inc., Oak Ridge, Tenn.

The main track drive 10 supports a chassis 16, which in turn supports a manipulator arm 18. The manipulator arm 18 is made up of a torso joint 20 sitting atop a torso joint housing 22 which is attached to the front of the chassis 16. This torso joint 20 rotates in a horizontal plane, while a shoulder joint 24 rotates in a vertical plane. There is a shoulder link 26 connected to the shoulder joint 24 which moves with rotation of either of the joints 20 or 24. The manipulator arm 18 also has an elbow joint 28 connected to the distal end of the shoulder link 26 which supports rotation of a forearm link 30 in a vertical plane. And finally, a three degree of freedom (3-DOF) wrist joint 32 is connected to the distal end of the forearm link 30 to support rotation of an attached gripper jaw 34 in the vertical and horizontal planes, as well as longitudinally about the forearm link 30. An example of a suitable 3-DOF wrist joint is the OMNI-Wrist manufactured by Ross-Hime Designs, Minneapolis, Minn.

An operator manually controls motion of all of the robot joints 20, 24, 28 and 32, and navigates the robot while viewing the operation via two onboard color CCD cameras. One camera 36 serves as a wrist camera and is mounted on the manipulator 18 immediately behind gripper jaw 34. This first camera 36 always points in the same direction as the front of the gripper jaw 34. The second camera 38, the pan/tilt camera, is mounted on a controllable pan/tilt platform consisting of a pan housing 40 and a tilt housing 42, which is in turn attached to the distal end of a cantilevered side boom 44. This side boom 44 is supported by and rotatable around the torso joint 20. The pan/tilt camera 38 provides excellent and remotely controllable side viewing of delicate operations. The ability to control and optimize the viewing angle in such tasks is critical to performance of the system and also makes it much easier to use. To this end another pan/tilt camera, platform, and boom can be added to the other side of the torso joint 20 to provide a second viewing angle, if desired. It should be noted that the cameras 36, 38 are also important in identifying an unknown substance at the accident site via its visual characteristics.

The robot also possesses several features and elements which render it safe to operate in areas containing combustible gases or vapors. First, all the motors used in the robot are brushless DC motors. The significance of using this type of motor is that during normal operation (i.e. when they have not undergone a mechanical or electrical failure) there are no sparks or electrical arcing produced which could ignite the combustible substances as would a conventional brushed motor typically found in electro-mechanically driven robots. These brushless DC motors include the left and right main track drive motors 46, 48, the front and rear articulated track drive motors 50, 52, the torso joint motor 54, the shoulder joint motor 56, the elbow joint motor 58, the three wrist joint motors 60, 62, 64 (i.e. one for each DOF), the gripper motor 66, the pan/tilt camera's boom motor 68, the pan/tilt camera platform's pan motor 70 and tilt motor 72, and the robot's winch motor 74.

In addition, all the electronics used in the robot are solid state. No mechanical relay switches are used which might arc or produce a spark. The bulk of the robot's electronics 76 are housed within the chassis 16. However, some of the robot's electronics associated with a combustible gas sensor assembly are located within the forearm link 30. And, the pan/tilt camera 38 also has electronic components.

The motors and electronics of the robot have also been mounted entirely within the body of the robot. To this end, certain sections of the robot, some of which are normally exposed to the outside, have been enclosed. The enclosed sections of the robot include the track drive motor housings 80, chassis 16, torso housing 22, shoulder link 26, forearm link 30, wrist joint 32, gripper housing 78, pan/tilt camera boom 44, pan housing 40, tilt housing 42, and the pan/tilt camera 38 itself. In the case of the wrist joint 32, a rigid enclosure is not possible since the wrist joint 32 moves with three degrees of freedom. Accordingly, a sealed bellows 82 is employed to enclose the wrist joint 32. This bellows 82 allows the wrist joint 32 to move freely, while still providing the desired enclosure. Enclosing the motors and electronics serves to protect these components from damage during operation of the robot should an object fall onto it, or the robot runs into something. In addition, enclosing the motors and electronics isolates them from the external environment, as will be discussed below. The enclosed sections are sealed for the most part, but are not perfectly airtight.

The non-sparking, non-arcing features of the electromechanical and electronic parts of the robot and their placement within the robot's body form the first level of safety built into the robot. However, it is still possible that the motors or electronics could malfunction, such that sparks could occur. In addition, combustible gasses and vapors could seep into the interior of the robot due to it not being perfectly air tight. To ensure that such occurrences do not make the robot susceptible to igniting the combustible gases and/or vapors, a second level of safety has been provided.

The second level of safety is provided by internally pressurizing the aforementioned enclosed sections of the robot. When pressurized, combustible gases and/or vapors in the surrounding environment are prevented from entering the robot and coming into contact with the electro-mechanical and electronic components. The positive internal pressure is preferably achieved via the use of an onboard tank 84 of compressed air (approximately 2200 psi) and a mechanical regulator 86 to reduce the pressure to approximately 2 inches of water. The pressurized air is routed from the regulator 86 to the interior of the chassis 16, via a tube 88. The connection point between the tube 88 and the chassis 16 is sealed to prevent leakage of the air. From the interior of the chassis 16, the pressurized air is further routed to the torso housing 22. From the torso housing 22, the air is routed to the shoulder link 26 and then to the elbow link 30. The air is next routed from the elbow link 30, to the wrist joint 32, and finally to the gripper housing 78. In addition, air is routed from the torso housing 22 to the pan/tilt camera boom 44. From there the air is further routed to the pan housing 40, then to the tilt housing 42, and finally to the pan/tilt camera 38 itself. Lastly, air is routed from the chassis 16 to the front and rear track drive motor housings 80.

The air could be routed between the enclosed sections of the robots via flexible tubes or hoses. Generally, these tubes could follow the path of the wiring harnesses that also run from section to section. However, there are problems associated with using flexible tubes. Some of the wiring harnesses run externally. For instance, the wiring harness 90 between the torso joint 20 and the shoulder link 26 runs outside the shoulder joint 24. If a tube were used to route the air and followed the path of this wiring harness 90, it would be exposed, and therefore susceptible to kinking or damage. This could result in a loss of pressurization to part or all of the enclosed sections of the robot.

Accordingly, it is preferred to employ one or more channels passing through the interior of the various joints and structures lying between the enclosed sections of the robot to route the air. This eliminates the kinking and damage problems associated with using tubes since the channels are completely contained within the body of the robot. However, the intervening joints and structures in the robot typically have only limited areas where through channels can be cut. This limits the cross-sectional size of any channel cut through the an intervening joint or structure. The cross-sectional size of the channel is of concern because the enclosed sections of the robot are sealed, but not airtight. Therefore, some amount of leakage will occur. The rate at which the air will leak out of the pressurized sections is in part dependent on the measure of the internal pressure. The higher the pressure is, the higher the leak rate. Since it is desirable that the robot's air tank 84 be as small and light as possible, the leak rate should be kept to as low as possible to allow for only a minimum amount of compressed gas being needed onboard the robot. Therefore, the pressure should be made as low as possible in the enclosed sections. Ideally, the pressure is just high enough to ensure all the enclosed sections are positively pressurized. However, as the cross-sectional area of the inside of a channel decreases, the pressure of the air flowing through it must be increased to maintain the same flow rate (which in this case must be at least equal the leak rate of the system). Therefore, sufficient cross-sectional area may not be available to maintain even the low flow rate a low leak rate affords, using only one channel. This problem of having sufficient cross-sectional area to maintain the required flow rate is solved by using multiple channels through each joint or structure. By passing several smaller channels through those intervening joints and structures where insufficient room exists to use only one channel, the cumulative effect is to provide a sufficient total cross-sectional area to maintain the necessary flow rate at the system pressure. It should be noted that having as low a system pressure as possible, and so a minimum leak rate, also allows the number and cross-sectional size of the channels to be minimized because only a minimum flow rate is required to match the lower leak rate. Minimizing the size and number of the channels has advantages if a pressurized section of the robot should be punctured because the smaller cross-sectional size would aid in limiting the amount of pressurized air that can escape from the sections preceding the punctured section. For instance, if the skin of the forearm link in the robot's manipulator arm should be punctured, a smaller cross-sectional size of the internal channels will minimize the increased leak rate due to the puncture. If the leak rate is kept low enough such that a positive pressure can be maintained in the pressurized sections of the drive train, the robot could be safely driven out of the accident site. This would preclude the possibility of emergency team personnel having to go into the accident site to retrieve a disabled robot.

The exact locations and configuration of these channels will vary depending on the configuration of the manipulator, pan/tilt camera assembly, and drive train. As many different assemblies are available, the details of the channel routing is not provided herein. A person skilled in the art could easily determine the appropriate location and number of channels based on the structure of the robot and its leak rate. However, an example of one such channel routing is shown in FIGS. 2a–b for the purpose of an example.

Figure 2A:
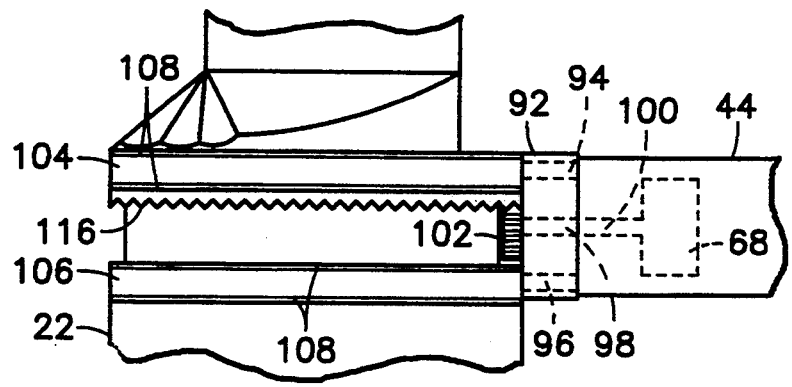
Figure 2B:
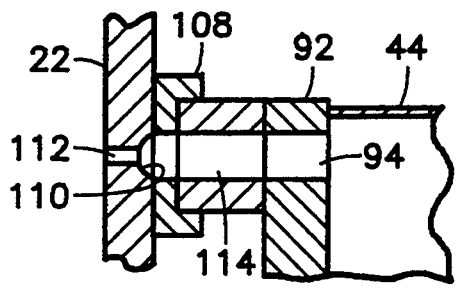

FIGS. 2a–b show a possible air channel configuration used to route air between the torso housing 22 and the pan/tilt camera boom 44. The boom 44 terminates in a plate 92. The plate 92 has an upper slot 94 and a lower slot 96. These slots 94, 96 open up into the interior of the boom 44. The plate 92 also has a center opening 98 through which a shaft 100 with a gear 102 at its end extends. The point where the shaft 100 exits the boom 44 is sealed to prevent leakage of pressurized air within the boom 44 through the exit point. An upper ring 104 and lower ring 106, each set into a nylon bushing 108, encircle the torso housing 22, and are rotatable around it. The portion of the torso housing 22 underlying each ring 104, 106 is grooved, and at six locations around the circumference of the each groove 110, through holes 112 extend to the interior of the torso housing 22. A through slot 114 having the same size and shape as the slots 94, 96 in the boom plate 92, exists at one location along the circumference of each ring 104, 106. The boom plate 92 is attached to the rings 104, 106 such that the slot 114 in the upper ring 104 interfaces with the upper slot 94 of the boom plate 92, and the slot 114 in the lower ring 106 interfaces with the lower slot 96 of the boom plate 92. The rings 104, 106 are separated by a distance which makes this interfacing possible. The gear 102 on the shaft 100 of the boom 44 interfaces with a gear rack ring 116 also attached to the torso housing 22 in between the two rings 104, 106. The boom 44 rotates about the torso housing 22 when the boom motor 68 rotates the shaft 100. Air flows through the holes 112 in the torso housing 22 and along the grooves 110 to the slots 114 in the rings 104, 106. The air then flows into the interior of the boom 44 via the slots 94, 96 in the boom plate 92. In this way, no matter where the boom 44 is along the circumference of the torso housing 22, air is provided to the interior of the boom 44.

A third level of safety is provided by pressure transducers 118 located at key locations within the enclosed sections of the robot. A pressure transducer 118 is located in each of the track drive motor housings 80, the chassis 16, the gripper housing 78 and the pan/tilt camera 38. A pressure transducer 118 is placed at the end of the manipulator arm 18 in the gripper housing 78 because a loss of pressure in any one of the enclosed sections of the arm 18 would be detectable at the gripper housing 78. Similarly, a pressure transducer 118 is placed in the pan/tilt camera 38 because a loss of pressure in either the boom 44, pan housing 40, tilt housing 42, or the camera 38 itself would be detectable in the camera 38. When any of the pressure transducers 118 indicates a loss of pressure below a pre-determined limit, the robot's on board computer 120 which monitors the pressure transducers 118, would immediately notify the operator of the problem and automatically shutdown the robot. As a further safety precaution, the robot's drive system has been designed so that in the event of a loss of power or shutdown, the robot will not roll backwards or forwards, as might happen if it was stopped on an incline. In addition, the robot's manipulator arm will lock into the position it was in when the power was lost.

Figure 3B:
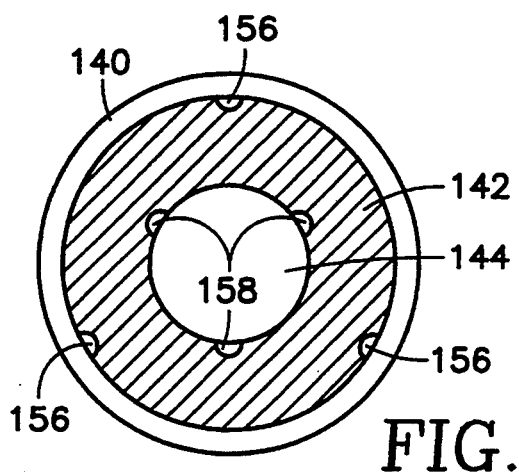
Figure 3A:
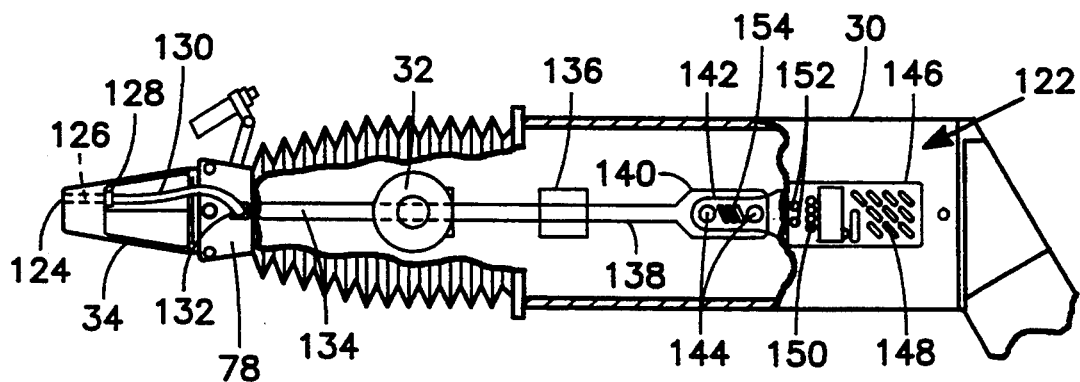
FIG. 3a is a side view of the forearm link, wrist joint and gripper assembly of the robot of FIG. 1a with a cutaway section revealing a combustible gas sensor assembly.

In addition to being able to safely operate in an environment containing combustible gases and/or vapor, the robot has the capability to sense and analyze air samples to determine the type of combustible substances that are present, and their concentrations. To this end a combustible gas sensor assembly 122 is included in the robot, as illustrated in FIGS. 3a–b. The gripper jaw 34 has first and second gripping fingers. There is a nose hole 124 in the front face of the tip of one of the fingers. It does not matter which finger is employed for this purpose. A sealed interior passageway 126 conducts the gases received through the hole 124 back through the interior of the gripper jaw finger. This passageway 124 terminates at a hose connector 128. A tube 130 is connected to this connector 128. The other end of the tube 130 is attached to a second hose connector 132 on the gripper housing 78. A second tube 134 is connected to the opposite side of the second hose connector 132 within the housing 78. This tube 132 is routed through the gripper housing 78 and the wrist joint 32 along the path provided for the wiring harnesses, and into the forearm link 30. The other end of the second tube 134 is connected to an air pump 136. The air pump 136 pulls air in from the nose hole 124 and routes it to a third tube 138 connected between the output of the air pump 136 and the inlet of an interfacing sleeve 140. This interfacing sleeve 140 tightly covers a sensor nipple 142 containing a series of sensors 144 mounted in the sensor nipple's interior. These sensors 144 are used to sense for combustible gases and vapors. The sensors 144 are connected to an electronic analyzer section 146 which analyzes the readings taken from the sensors 144. The analyzer section 146 is mounted to the wall of the forearm link 30 such that a portion thereof containing a user input keypad 148 and various electronic interfaces 150 is exposed to the outside through an opening in the exterior surface of the forearm link 30. The opening is sealed around the analyzer section 146 so that the pressurized air within the forearm link 30 can not escape.

The air pulled in from the nose hole 124 and passed over the sensors 144 is exhausted to the outside through holes 152 in the exposed portion of the analyzer section 146. A data output of the analyzer section 146 is connected to the robot's onboard computer.

In the preferred version of the present invention, the air pump 136, sensor nipple 142, sensors 144, and analyzer section 146 are components taken from an AIM 3300 multi-purpose purpose chemical sensor, manufactured by AIM Inc. of Dallas, Tex. This unit has the ability to simultaneously and continuously sense for the presence of combustible gases and vapors, determine the type of combustible substance present, and measure the concentration relative to a preset Lower Explosive Limit (LEL). It is also capable of measuring the percent level of oxygen present in the atmosphere. The AIM 3300 comes as a one-piece unit shaped similar to a flashlight. For purposes of this invention, the unit is disassembled and installed in parts within the manipulator arm 18 as described above. The sensor nipple of the AIM 3300 has inlet slots 154 to let in the air to be tested. However, to ensure the air drawn in from the nose hole 124 is routed to the sensors 144 without leaking into the interior of the forearm link 30, the sensor nipple 142 has to be modified. As shown in FIG. 3b, longitudinal slots 156 are milled into the exterior surface of the sensor nipple 142. The air entering the interfacing sleeve 140 is routed along these external slots 156 to the inlet slots 154 of the nipple 142. There are also a series of longitudinal slots 158 milled in the interior surface of the sensor nipple 142. These slots 158 aid in the movement of air over the sensors 144 and route the air to the exhaust holes 152 in the analyzer section 146.

The sensing system 122 is operated by pointing the gripper jaw 34 at the particular area within the environment which is to be analyzed, activating the system 122, and taking a sample of air. Sensory data output by the sensing system 122 is collected by the onboard computer 120, and transmitted in real-time to the operator via a wired communications link or a radio transmitter.

While the invention has been described by specific reference to preferred embodiments thereof, it is understood that variations and modifications thereof may be made without departing from the true spirit and scope of the invention.

What is claimed is:

1. A mobile, remote-controlled robot for operating safely in a surrounding combustible atmosphere, comprising:
   (a) positively pressurized enclosures enclosing all electro-mechanical and electronic components of the robot for preventing the intrusion of the combustible atmosphere into the enclosures; and,
   (b) a supply of pressurized gas disposed onboard the robot and connected to at least one of the enclosures.

2. A robot according to claim 1, wherein:
   the enclosures are interconnected such that a pressurized gas injected into one of the enclosures is routed to all the other enclosures through the interconnections.

3. A robot according to claim 2, wherein the interconnections comprise:
   at least one sealed internal channel through non-pressurized structures intervening between the enclosures, the at least one sealed internal channel being of sufficient cross-sectional size and number to allow a flow rate of gas at least equal to a combined leak rate of the enclosures at a pre-determined pressure.

4. A robot according to claim 3, wherein:
   (a) the pre-determined pressure is chosen so as to ensure a positive pressure in all the enclosures while minimizing the leak rate; and,
   (b) the cross-sectional size and number of the at least one sealed internal channel is minimized so as to be just sufficient enough to maintain a flow rate approximately equal to the minimized leak rate.

5. A robot according to claim 1, and further comprising:
   (a) pressure transducers for detecting whenever the pressure within the enclosures falls below a pre-determined level; and,
   (b) means for informing an operator and shutting down the robot whenever the pressure within the enclosures falls below a pre-determined level.

6. A robot according to claim 1, and further comprising:
   non-sparking and non-arcing electro-mechanical components; and,
   (b) non-sparking and non-arcing electronic components.

7. A robot according to claim 6, wherein:
   the non-sparking and non-arcing electro-mechanical components comprise brushless DC motors.

8. A robot according to claim 1, and further comprising:
   sensing means for determining,
      types of combustible substances in the surrounding combustible atmosphere,
      concentrations of each type of combustible substance relative to a pre-determined lower explosive limit (LEL), and,
      percent level of oxygen present in the combustible atmosphere.

9. A robot according to claim 8, wherein the robot has a manipulator arm with an end effector at a distal end, said effector having an end surface, and wherein the sensing means comprises:
   (a) a nose hole in the end surface of the end effector;
   (b) an interior channel within said end effector coupled to the nose hole; and
   (c) a combustible gas and vapor sensor on board said robot and coupled to the interior channel.

10. A robot according to claim 9 wherein the sensing means further comprises an air pump coupled to said interior passage for drawing air through said nose hole.

11. A mobile, remote-controlled robot for operating safely in a surrounding combustible atmosphere, comprising:
   (a) non-sparking and non-arcing electro-mechanical components;
   (b) non-sparking and non-arcing electronic components;
   (c) remote control means for moving the robot to, from and within a location having a combustible atmosphere;
   (d) positively pressurized enclosures enclosing all electro-mechanical and electronic components of the robot for preventing the intrusion of the combustible atmosphere into the enclosures;
   (e) pressure transducers for detecting whenever the pressure within the enclosures falls below a pre-determined level;

(f) means for informing an operator and shutting down the robot whenever the pressure within the enclosures falls below a pre-determined level; and,
(g) sensing means for determining,
- (g1) types of combustible substances in the surrounding combustible atmosphere,
- (g2) concentrations of each type of combustible substance relative to a pre-determined lower explosive limit (LEL), and,
- (g3) percent level of oxygen present in the combustible atmosphere; and wherein, (h) the robot has a manipulator arm with an end effector at a distal end, said effector having an end surface, and the sensing means comprises,
- (h1) a nose hole in the end surface of the end effector;
- (h2) an interior channel within said end effector coupled to the nose hole; and
- (h3) a combustible gas and vapor sensor on board said robot and coupled to the interior channel.

12. The robot according to claim 11 wherein the sensing means further comprises an air pump coupled to said interior channel passage for drawing air through said nose hole.

13. A mobile, remote-controlled robot for operating safely in a surrounding combustible atmosphere, comprising:

(a) positively pressurized enclosures enclosing electro-mechanical and electronic components of the robot for preventing the intrusion of the combustible atmosphere into the enclosures;
(b) remote control means for moving the robot to, from and within a location having a combustible atmosphere; and,
(c) sensing means for determining,
- (c1) types of combustible substances in the surrounding combustible atmosphere,
- (c2) concentrations of each type of combustible substance relative to a pre-determined lower explosive limit (LEL), and,
- (c3) percent level of oxygen present in the combustible atmosphere; and wherein, (d) the robot has a manipulator arm with an end effector at a distal end, said effector having an end surface, and the sensing means comprises,
- (d1) a nose hole in the end surface of the end effector;
- (d2) an interior channel within said end effector coupled to the nose hole; and
- (d3) a combustible gas and vapor sensor on board said robot and coupled to the interior channel.

14. The robot according to claim 13 wherein the sensing means further comprises an air pump coupled to said interior channel passage for drawing air through said nose hole.

* * * * *